United States Patent
Brink et al.

(10) Patent No.: US 8,170,483 B2
(45) Date of Patent: May 1, 2012

(54) HEADSET

(75) Inventors: Mette Brink, Hillerød (DK); Erik Sonne, Vanløse (DK)

(73) Assignee: GN Netcom A/S (DK)

( * ) Notice: Subject to any disclaimer, the term of this patent is extended or adjusted under 35 U.S.C. 154(b) by 384 days.

(21) Appl. No.: 12/340,960

(22) Filed: Dec. 22, 2008

(65) Prior Publication Data

US 2009/0111535 A1 Apr. 30, 2009

Related U.S. Application Data

(63) Continuation of application No. 10/573,140, filed on Nov. 27, 2006, now abandoned.

(30) Foreign Application Priority Data

Sep. 29, 2003 (DK) .................................. 2003 01409

(51) Int. Cl.
*H04B 7/00* (2006.01)
(52) U.S. Cl. ...................... 455/41.2; 455/74.1
(58) Field of Classification Search ................. 455/41.2, 455/420, 466, 456.6, 90.1, 74.1, 426.2, 41.1, 455/554.1; 379/430, 267
See application file for complete search history.

(56) References Cited

U.S. PATENT DOCUMENTS

| | | | | |
|---|---|---|---|---|
| 6,081,596 A * | 6/2000 | Britto et al. | | 379/447 |
| 6,091,812 A * | 7/2000 | Iglehart et al. | | 379/308 |
| D433,005 S | 10/2000 | McGugan | | |
| 6,782,106 B1 * | 8/2004 | Kong et al. | | 381/74 |
| 7,187,948 B2 * | 3/2007 | Alden | | 455/557 |
| 2002/0061009 A1 | 5/2002 | Sorensen | | |
| 2002/0071549 A1 * | 6/2002 | Liang | | 379/419 |
| 2002/0090912 A1 * | 7/2002 | Cannon et al. | | 455/41 |
| 2002/0098878 A1 * | 7/2002 | Mooney et al. | | 455/569 |
| 2003/0045235 A1 * | 3/2003 | Mooney et al. | | 455/41 |
| 2003/0197488 A1 * | 10/2003 | Hulvey | | 320/135 |
| 2003/0236091 A1 * | 12/2003 | Wonak et al. | | 455/426.2 |
| 2004/0072544 A1 * | 4/2004 | Alexis | | 455/74.1 |

FOREIGN PATENT DOCUMENTS

| | | |
|---|---|---|
| WO | WO 99/49642 | 9/1999 |
| WO | WO 00/72555 | 11/2000 |
| WO | WO 00/72555 A1 * | 11/2000 |

* cited by examiner

*Primary Examiner* — Ping Hsieh
(74) *Attorney, Agent, or Firm* — Altera Law Group, LLC

(57) ABSTRACT

A communication unit, e.g. a headset, constructed as a slave station which may be coupled to a plurality of master stations, e.g. a mobile telephone, via a short-ranged communications connection, such as of the Bluetooth type or the DECT type, and has a plurality of address fields in which one or more identification keys may be stored. At least one of the address fields has an associated electrical lock which may be unlocked only by an adapter master station having a unique indentification key. It is also possible to "lift" the receiver of the public switched telephone electrically or mechanically via the headset, so that a call and conversations from the public switched telephone may be made and take place via the headset. In an embodiment, the coupling box has a recess in which the headset may be placed and be charged via a charging unit in the coupling boy. The invention ensures that the public switched telephone is used as much as possible, which, in addition to a better sound reproduction, is favorable in terms of costs.

17 Claims, 1 Drawing Sheet

HEADSET

Figure 1:
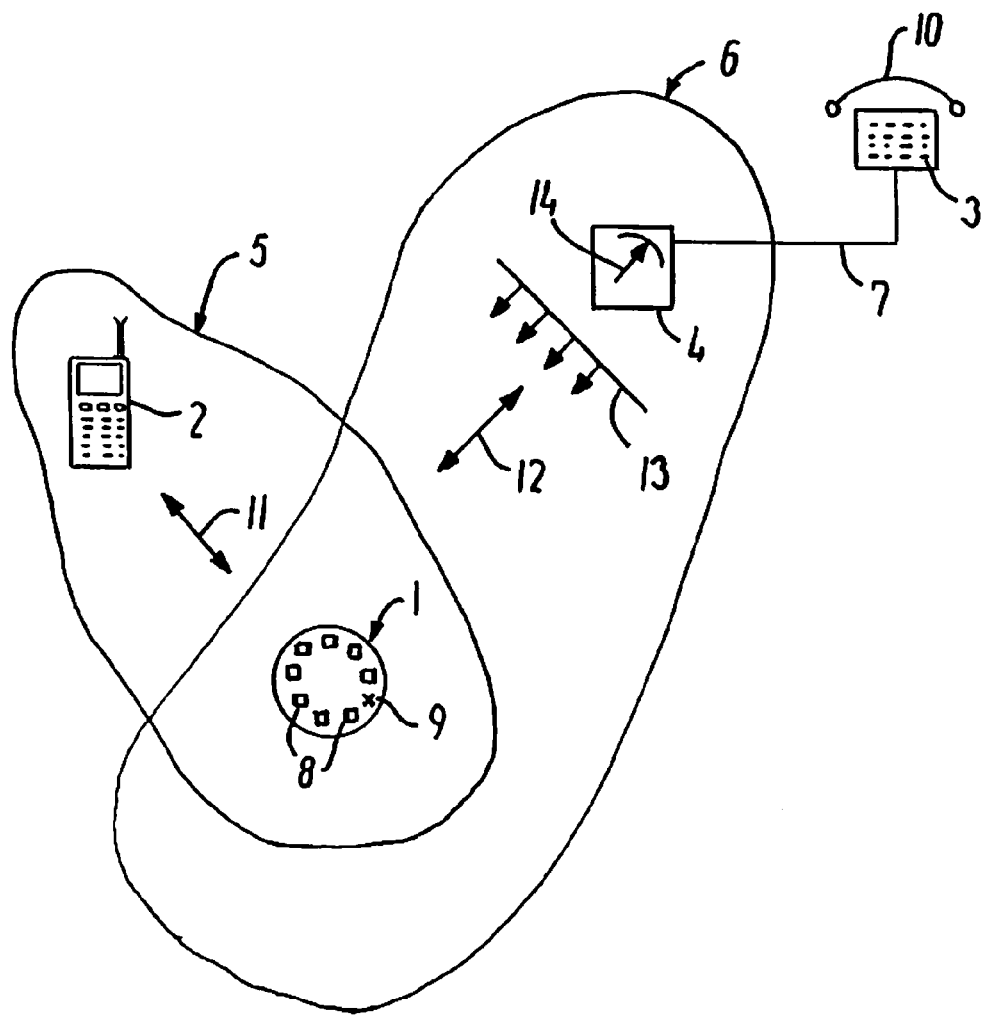

This application is a continuation of application Ser. No. 10/573,140, filed Nov. 27, 2006, now abandoned. The application is incorporated herein by reference.

The invention relates to a communications unit constructed as a slave station which is adapted to be coupled to a plurality of master stations, said communications unit having a memory with a plurality of address fields in which one or more identification keys may be stored, said master station or stations having an identification cell with an identification key, wherein a coupling is established between one of the master stations and the communications unit in that the identification key of the master station is stored in one of the address fields of the communications unit.

The system principles of a network including a headset as mentioned above are described e.g. in the published US Patent Application No. 2002/0061009 A1.

Today, many mobile telephones use headsets in connection with a call and an answer to a call, as the user of the mobile telephone may hereby have his or hers hands free for other tasks during a call, which may be e.g. be the operation of a PC.

Previously, the headset was connected to the mobile telephone via a wire, but after the provision of short-ranged communications connections it has become widespread practice to use these instead of a wired connection.

The two most widely used wireless connections are the so-called Bluetooth and DECT standards, where Bluetooth has a range of about 10 meters, while the DECT standard has a range of about 150 meters.

Known today are also wireless communications connections between public switched telephones and headsets, where the wireless connections are likewise based on Bluetooth and DECT.

Such a connection between a public switched telephone and a headset is established by inserting an adapter circuit between the public switched telephone and the headset, said adapter circuit being connected by a wire to the public switched telephone and wirelessly to the headset. This adapter station may generally be configured as a holder for the headset and may contain a charging circuit for the headset. An example of such an adapter station may be seen in U.S. Design Pat. No. D 433005.

To additionally improve the user friendliness of a headset in connection with a public switched telephone, an electrical circuit may be inserted which "lifts the receiver" at a call to the public switched telephone so that the user need not walk over to the public switched telephone to answer a call, but may do so directly from the headset.

Another option is to add a mechanical lifting device to the public switched telephone to lift the receiver, e.g. if the given public switched telephone is not suitable for an electrical solution. An example of a mechanical lifting device is described in WO 99/49642.

Although mobile telephony has gained widespread use and has clearly overtaken the public switched telephones in terms of growth, it is still so that the public switched telephone has a better sound quality in spite of considerable technical improvements of the mobile telephone technique. In addition, it is considerably cheaper to use the public switched telephone than the mobile telephone.

Although many mobile telephone users have access to the public switched telephone and quite often are present in the vicinity of the public switched telephone, be it at home or at the office, it is so that the public switched telephone is frequently "forgotten" when a call is to be made. The reason for this may be of a purely habitual nature, but another factor coming into play is presumably that mobile telephones are equipped with. more sophisticated call options and provide easier access to telephone numbers, as they are easy to store and find in the mobile telephone.

In the light of this, it is desirable to be able to design a telephone system where all the advantages of the mobile telephone are incorporated, and where calls from the public switched telephone become a more natural act, while maintaining the same comfort.

The object of the invention is achieved by a headset of the type defined in the introductory portion of claim 1, which is characterized in that at least one of the address fields of the communications unit is configured with an address field and an associated electrical lock, and that the address may be overwritten only if the master station has a unique identification key to open the electrical lock.

Hereby, it is possible to establish an automatic coupling between the communications unit and the master station, as the address field in the communications unit is hereby reserved to be coupled only to a communications unit which has the unique identification key.

When, as stated in claim 2, the fixed address field is predefined to be coupled only to specific master stations, it is advantageously ensured that only selected master stations having the unique identification key may be coupled to the communications unit.

Expediently, as stated in claim 3, the coupling is established with a short-ranged communications connection of the Bluetooth type or of the DECT type, and additionally it is user-friendly if, as stated in claim 4, the communications unit is a headset.

With a view to adapting a master station with an identification cell to a communications unit with as few electrical changes in the master station as possible, it is an advantage if, as stated in claim 5, the master station is an adapter master station having a unique identification key, and that the adapter master station is coupled, optionally wirelessly, to the other master station, preferably to a public switched telephone.

It is an advantage to a user wishing to make call, e.g. by activating a button on the headset, if, as stated in claim 6, the adapter master station emits indication signals to the communications unit, allowing it be verified in the communications unit, e.g. via sound emission, whether it may be connected to the adapter master station, and if so a prioritized connection to the adapter master station is provided.

This advantage is particularly pronounced if, as stated in claim 7, the master station is a public switched telephone, a mobile telephone or the like.

To improve the user's comfort when connections are established to various master stations, it is an advantage if, as stated in claim 8, the adapter master station has a volume control unit to adjust the strength of a signal between the communications unit and a master station, e.g. a public switched telephone, relative to the strength of the signal between the headset and another master station, e.g. a mobile telephone.

To improve the comfort, in the sense that it should be just as attractive to use the public switched telephone for calls as it is to use the mobile telephone, it is an advantage if, as stated in claim 9, the adapter master station has an electrical circuit or a mechanical structure adapted to lift or hang up the receiver of the public switched telephone, which provides the advantage that when receiving a call the user need not physically walk over to the public switched telephone.

This advantage is enhanced additionally if, as stated in claim 10, the adapter master station emits a sound at a call.

If, as stated in claim 11, the adapter master station has a charging unit to charge the headset, the need of acquiring an independent charging unit is eliminated, and at the same time the user is currently made aware of the presence of the public switched telephone.

Figure 2:
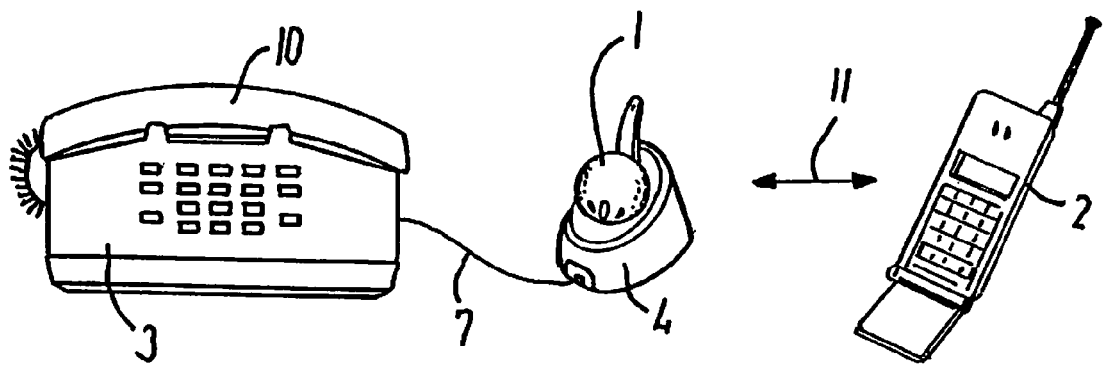

The invention will now be explained more fully with reference to the drawing, in which FIG. 1 shows the principle of the functionality of the communications unit according to the invention, while FIG. 2 shows an example of how the coupling between a headset, a public switched telephone and a headset is set up.

In FIG. 1, the numeral 1 designates a communications unit, here as a headset of the wireless type, which may communicate with e.g. another communications unit in the form of a master station by means of a Bluetooth or DECT coupling, schematically indicated by the arrows 11, 12. The headset has a plurality of address fields, some of which, shown at 8, may be addressed, as is known, while other address fields, only one of which is shown and designated 9, have an address which may be changed only under certain conditions, cf. below.

This address requires an identification key which a master station must possess in order to be able to establish a coupling between the master station and the communications unit.

In FIG. 1, the communications unit is coupled in two so-called piconet networks, which are designated 5 and 6, respectively. One piconet network 5 is shown to include a master station, here a mobile telephone 2, and a headset 1, while the other piconet network 6 is shown to include the headset 1 and an adapter master station 4, whose function will be explained later, as well as an external unit which is coupled to the adapter master station 4 and is shown as a public switched telephone 3.

It will now be explained how the communication takes place in the piconet network 5. If a headset moves into the area 5 in which the mobile telephone 2 is present and an activation signal is applied from the headset 1, then an identification key will be transferred via a short-ranged communications connection from the mobile telephone 2 to an address field in the headset 1, thereby setting up the communications connection between the headset 1 and the mobile telephone 2.

Thus, a user may either let his mobile telephone 2 remain in his pocket or leave it on a table and receive a call to the mobile telephone 2 via the headset 1.

If the user leaves the area and moves into another area, the same process may be repeated in that a new identification key is stored in the headset 1 for coupling to another master station, which may be a mobile telephone, a PC or the like.

In the case where all address fields in the headset, typically eight in number, are used, a request for coupling to a further master station will mean that one of them, e.g. the oldest address field, is overwritten.

If also a speech recognition circuit is connected to transfer commands from the headset to the mobile telephone, it is moreover possible to make a call from the headset without it being necessary to operate the mobile telephone.

The above-mentioned fixed address field 9 is used for interconnecting a headset and a master station which has a unique identification key, said fixed address field having an associated electrical lock which can only be opened by a unique identification key. In other words, only a master station having a unique identification key will be able to store its address in the adapter master station 4. Thus, the address field 9 cannot be overwritten without the electrical lock having been opened.

The adapter master station may generally be equipped with a circuit (not shown) which emits indication signals, shown schematically at 13, which can be captured by the headset, which can in turn apply a sound signal to a user who will then be made aware that it is possible to use the public switched telephone when making a call or answering a call. Optionally, the sound signal may just be emitted when the user enters or leaves the coverage area of the communications connection between the adapter master station and the headset.

Additionally, the adapter master station 4 may be equipped with a volume control, indicated by the reference numeral 14, which allows a user to adapt the volume from the public switched telephone 3 to the same level as the volume from the mobile telephone 2, as the user just makes a couple of calls, partly on the public switched telephone and partly on the mobile telephone until the volume from the two telephones has been adjusted to be the same.

As shown in FIG. 1, the master station may be a public switched telephone 3 which may be coupled to the headset through its identification key, and since the identification key may be stored in the headset, the connection to the headset may be established merely by the user moving into an area in which the short-ranged communications connection may be established.

Where appropriate, the headset may be adapted to apply a signal to the user when the communications connection has been established, so that the user is aware of the coupling to an alternative connection which the user himself has not set up.

The adapter master station 4 is a unit having an input and an output, said input being a wireless communications gate which is adapted to communicate with the headset 1 via a short-ranged communications connection 12. The output is shown here as a wired connection 7 coupled to a public switched telephone 3.

Optionally, an electrical or mechanical lifting mechanism is provided for the public switched telephone, so that the receiver 10 may be lifted off without the user himself having to do this physically.

FIG. 2 shows a setup with physical communications units connected as described in connection with the principles which have been described in connection with FIG. 1.

As will be seen in FIG. 2, the headset 1, the mobile telephone 2, the public switched telephone 3 with the receiver 10, and the adapter master station 4 are included. The headset 1 is arranged in the adapter master station 4, which is constructed such that the headset 1 may be placed in it, and can charge the headset 1 via a charging circuit (not shown).

A number of examples of possible functionalities of the setup shown in FIG. 1 and in FIG. 2 are given below.

A user is present in an area where he is coupled to receive calls from a plurality of mobile telephones and a public switched telephone. At the moment when one of the mobile telephones or the public switched telephone is ringing, the user answers the call by activating a button on the headset, following which the correct connection is established, since all mobile telephones and the public switched telephone are separately identifiable via the addresses which are stored in the headset. As an option, the user may decide to redirect a call from the mobile telephone to the public switched telephone so as to achieve the best sound quality.

If the user wishes to make an outgoing call, there are several options.

The setup may be designed such that at the moment when the user activates a call button on his headset, the communications connection will automatically be established between the headset and the public switched telephone via the adapter master station, whereby the user obtains the best sound quality and charge for the call.

Anther option is that the communications connection is established to the unit which is closest to the user. In the last-mentioned case, it is most practical if the user is informed via the headset of the mobile telephone to which a connection has been established.

Finally, it is possible to make a call from an arbitrary unit by means of a speech recognition circuit, also without the user necessarily knowing from which unit he calls.

Although the invention has been explained particularly in connection with piconet networks which include mobile and public switched telephony, nothing prevents the invention from being applied, within the scope defined by the claims, in piconet networks including a plurality of slave stations, a plurality of master stations and a plurality of adapter master stations which are interconnected via wireless short-ranged communications connections and optionally partly connected via wires. There is also the option that the electrical lock may be configured as a lock which is activated by a PIN code.

The invention claimed is:

1. A headset communications unit constructed as a slave station which is adapted to be coupled to a plurality of master stations via a wireless connection, said headset communications unit having a memory with a plurality of accessible address fields in which identification addresses may be stored, each of said fields be filled with an address of master stations as they come into range of said headset unit overwriting addresses previously stored in case all fields have been previously filled, and wherein one of said address fields being designated as a locked field, to be filled with and address from a predetermined master station, said locked field being incapable of being overwritten regardless of attempts by other master stations to fill said locked field.

2. A communications unit according to claim 1, wherein the fixed address field is predefined to be coupled only to specific master stations.

3. A communications unit according to claim 1, wherein the coupling is established with a short-ranged communications connection of the Bluetooth type or the DECT type.

4. A communications connection according to claim 1, wherein the communications unit is a wireless headset and wherein one of the master stations is a mobile phone.

5. A communications unit according to claim 1, wherein the master station is an adapter master station having a unique identification key, and that the adapter master station is coupled, optionally wirelessly, to a public switched telephone.

6. A communications unit according to claim 5, wherein the adapter master station emits indication signals to the communications unit, allowing it to be verified in the communications unit, e.g. via sound emission, whether it may be coupled to the adapter master station, and if so a prioritized connection to the adapter master station is provided.

7. A communications unit according to claim 5, wherein the adapter master station has a volume control unit to adjust the strength of a signal between the communications unit and a master station, e.g. a public switched telephone, relative to the strength of the signal between the headset and another master station, e.g. a mobile telephone.

8. A communications unit according to claim 5, wherein the adapter master station has an electrical circuit or a mechanical structure adapted to lift or hang-up the receiver of the public switched telephone.

9. A communications unit according to claim 5, wherein the adapter master station emits a special sound at a call.

10. A communications unit according to claim 5, wherein the adapter master station has a charging unit to charge the headset.

11. A communications connection according to claim 1, wherein the master station is a public switched telephone, a mobile telephone or the like.

12. The unit of claim 1 wherein said locked field is configured with a fixed address field and an associated electrical lock, and that the address field may be overwritten only if a predetermined master station of the plurality of master stations has a unique identification key to open the electrical lock.

13. The unit of claim 12 wherein said plurality of master stations each have special key with the capability to unlock the electrically locked field.

14. The unit of claim 1 wherein one of said fields is filed with a address from a PSTN network connection and one from a mobile telephone network and wherein the headset includes user selectable switch capable of redirecting incoming calls from one network to the other.

15. The unit of claim 14 further including a user selectable switch to select one of several available networks for outgoing calls.

16. A headset communications unit constructed as a slave station which is adapted to be coupled to a plurality of master stations via a wireless connection, said headset communications unit having a memory with a plurality of accessible address fields in which identification addresses may be stored, each of said fields be filled with an address of master stations as they come into range of said headset unit overwriting addresses previously stored in case all fields have been previously filled, and wherein one of said address fields being designated as a locked field requiring an identification key to unlock, to be filled with and address from a predetermined master station, said locked field being incapable of being overwritten regardless of attempts by other master stations to over-write said locked field and can only be over-written by a master station have a required unique identification unlock key.

17. The headset of claim 16 wherein said identification key is a special PIN code which has the capability of unlocking the locked field.

* * * * *